(12) United States Patent
Luo et al.

(10) Patent No.: US 10,407,076 B2
(45) Date of Patent: Sep. 10, 2019

(54) METHOD AND SYSTEM FOR DETERMINING ROAD FRICTIONS OF AUTONOMOUS DRIVING VEHICLES USING LEARNING-BASED MODEL PREDICTIVE CONTROL

(71) Applicants: Baidu USA LLC, Sunnyvale, CA (US); Baidu.com Times Technology (Beijing) Co., Ltd., Beijing (CN)

(72) Inventors: Qi Luo, Sunnyvale, CA (US); Fan Zhu, Sunnyvale, CA (US); Sen Hu, Sunnyvale, CA (US); Qi Kong, Sunnyvale, CA (US); Xiang Yu, Sunnyvale, CA (US); Zhenguang Zhu, Beijing (CN); Yuchang Pan, Beijing (CN); Wenli Yang, Beijing (CN); Guang Yang, San Jose, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 206 days.

(21) Appl. No.: 15/327,036

(22) PCT Filed: Jan. 13, 2017

(86) PCT No.: PCT/CN2017/071108
§ 371 (c)(1),
(2) Date: Jan. 18, 2017

(87) PCT Pub. No.: WO2018/129711
PCT Pub. Date: Jul. 19, 2018

(65) Prior Publication Data
US 2018/0304900 A1    Oct. 25, 2018

(51) Int. Cl.
B60W 40/06    (2012.01)
G01C 21/34    (2006.01)
(Continued)

(52) U.S. Cl.
CPC ....... *B60W 40/068* (2013.01); *G01C 21/3453* (2013.01); *G05D 1/0088* (2013.01);
(Continued)

(58) Field of Classification Search
CPC ....... B60W 40/068; B60W 2050/0089; B60W 2520/10; G05D 1/0088; G05D 2201/0213; G08G 1/096888; G01C 21/3453
See application file for complete search history.

(56) References Cited

U.S. PATENT DOCUMENTS

2016/0035223 A1*  2/2016  Gutmann .............. B60W 30/09
                                                           340/907
2016/0375901 A1* 12/2016  Di Cairano .......... B60W 30/09
                                                           701/26
(Continued)

*Primary Examiner* — Rodney A Butler
(74) *Attorney, Agent, or Firm* — Womble Bond Dickinson (US) LLP

(57) ABSTRACT

In one embodiment, planning data is received, for example, from a planning module, to drive an autonomous driving vehicle (ADV) from a starting location and a destination location. In response, a series of control commands are generated based on the planning data, where the control commands are to be applied at different points in time from the starting location to the destination location. A cost is calculated by applying a cost function to the control commands, a first road friction to be estimated in a current trip, and a second road friction estimated during a prior trip from the starting location to the destination location. The first road friction of the current trip is estimated using the cost function in view of a prior termination cost of the prior trip, such that the cost reaches minimum.

22 Claims, 8 Drawing Sheets

(51) Int. Cl.
*G08G 1/09* (2006.01)
*G05D 1/00* (2006.01)
*B60W 40/068* (2012.01)
*G08G 1/0968* (2006.01)
*B60W 50/00* (2006.01)

(52) U.S. Cl.
CPC ............... *G08G 1/096888* (2013.01); *B60W 2050/0089* (2013.01); *B60W 2520/10* (2013.01); *G05D 2201/0213* (2013.01)

(56) References Cited

U.S. PATENT DOCUMENTS

| | | | |
|---|---|---|---|
| 2017/0010613 A1* | 1/2017 | Fukumoto | G08G 1/096827 |
| 2017/0084178 A1* | 3/2017 | Jain | G08G 1/167 |
| 2017/0090478 A1* | 3/2017 | Blayvas | G01C 21/3453 |
| 2018/0113470 A1* | 4/2018 | Iagnemma | G05D 1/0088 |
| 2018/0283895 A1* | 10/2018 | Aikin | G01C 21/3415 |

* cited by examiner

METHOD AND SYSTEM FOR DETERMINING ROAD FRICTIONS OF AUTONOMOUS DRIVING VEHICLES USING LEARNING-BASED MODEL PREDICTIVE CONTROL

CROSS-REFERENCE TO RELATED APPLICATION

This patent application is a U.S. National Phase Application under 35 U.S.C. § 371 of International Application No. PCT/CN2017/071108, filed Jan. 13, 2017, entitled METHOD AND SYSTEM FOR DETERMINING ROAD FRICTIONS OF AUTONOMOUS DRIVING VEHICLES USING LEARNING-BASED MODEL PREDICTIVE CONTROL, which is incorporated by reference herein by its entirety.

TECHNICAL FIELD

Embodiments of the present invention relate generally to operating autonomous vehicles. More particularly, embodiments of the invention relate to determining road frictions for autonomous driving vehicles.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. However, conventional motion planning operations estimate the difficulty of completing a given path mainly from its curvature and speed, without considering the differences in features for different types of vehicles. Same motion planning and control is applied to all types of vehicles, which may not be accurate and smooth under some circumstances.

In addition, road friction is critical in increasing the vehicle path control in autonomous driving. However, it is difficult to determine road friction utilizing direct measurement methods.

SUMMARY

Embodiments of the present disclosure provide a computer-implemented method for operating an autonomous driving vehicle, a non-transitory machine-readable medium, and a data processing system.

In an aspect of the disclosure, the computer-implemented method for operating an autonomous driving vehicle comprises: receiving planning data to drive an autonomous driving vehicle (ADV) from a starting location and a destination location; generating a series of control commands based on the planning data, the control commands to be applied at a plurality of points in time from the starting location to the destination location; calculating a cost by applying a cost function to the control commands, a first road friction to be estimated in a current trip, and a second road friction estimated during a prior trip from the starting location to the destination location; and estimating the first road friction of the current trip using the cost function in view of a prior termination cost of the prior trip, such that the cost reaches minimum.

In another aspect of the disclosure, the non-transitory machine-readable medium has instructions stored therein, which when executed by a processor, cause the processor to perform operations, the operations comprising: receiving planning data to drive an autonomous driving vehicle (ADV) from a starting location and a destination location; generating a series of control commands based on the planning data, the control commands to be applied at a plurality of points in time from the starting location to the destination location; calculating a cost by applying a cost function to the control commands, a first road friction to be estimated in a current trip, and a second road friction estimated during a prior trip from the starting location to the destination location; and estimating the first road friction of the current trip using the cost function in view of a prior termination cost of the prior trip, such that the cost reaches minimum.

In a further aspect of the disclosure, the data processing system comprises: a processor; and a memory coupled to the processor to store instructions, which when executed by the processor, cause the processor to perform operations, the operations including: receiving planning data to drive an autonomous driving vehicle (ADV) from a starting location and a destination location, generating a series of control commands based on the planning data, the control commands to be applied at a plurality of points in time from the starting location to the destination location, calculating a cost by applying a cost function to the control commands, a first road friction to be estimated in a current trip, and a second road friction estimated during a prior trip from the starting location to the destination location, and estimating the first road friction of the current trip using the cost function in view of a prior termination cost of the prior trip, such that the cost reaches minimum.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
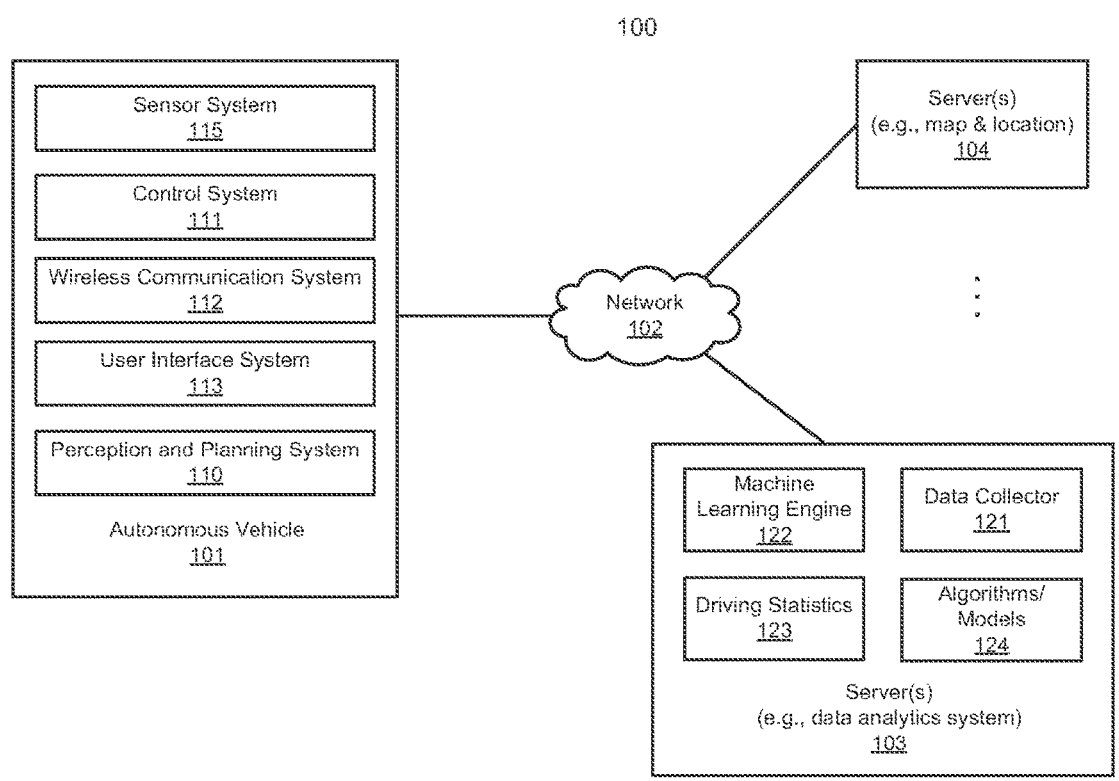
FIG. 1 is a block diagram illustrating a networked system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

In daily commute, drivers typically travel between two fixed locations such as home and workplace on a regular basis. Thus, they are roughly the same starting location and the destination location. According to some embodiments, a learning-based model predictive control (MPC) mechanism is utilized to learn and adaptively update estimations unknown parameters such as road frictions to optimize the control algorithms of autonomous driving. For each trip from a starting location to a destination location, road friction is estimated based on the vehicle reactions (e.g., locations, speed, direction) in response to control commands (e.g., throttle, brake, steering commands) issued at different points in time along a path between the starting location and the destination location.

The road friction of a current trip is estimated based on the road friction estimated during a prior trip from the same starting location to the destination location using an MPC method. A cost is calculated for each of the trips based on the differences between the road frictions of the current trip and the last trip using a cost function. The road frictions are iteratively estimated for each trip from the starting location to the destination, until a difference of the costs of the last two trips drops below a predetermined threshold. At that point, the last estimated road friction is designated as the final road friction going forward for the road between the starting location and the destination location. The road friction may be utilized to determine or adjust subsequent control commands for the purpose of driving an autonomous driving vehicle from the starting location and the destination location.

In one embodiment, planning data is received, for example, from a planning module, to drive an autonomous driving vehicle (ADV) from a starting location and a destination location. In response, a series of control commands are generated based on the planning data, where the control commands are to be applied at different points in time from the starting location to the destination location. A cost is calculated by applying a cost function to the control commands, a first road friction to be estimated in a current trip, and a second road friction estimated during a prior trip from the starting location to the destination location. The first road friction of the current trip is estimated using the cost function in view of a termination cost of the prior trip, such that the cost reaches minimum. The termination cost was the cost calculated at the destination of the prior strip.

FIG. 1 is a block diagram illustrating an autonomous vehicle network configuration according to one embodiment of the invention. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
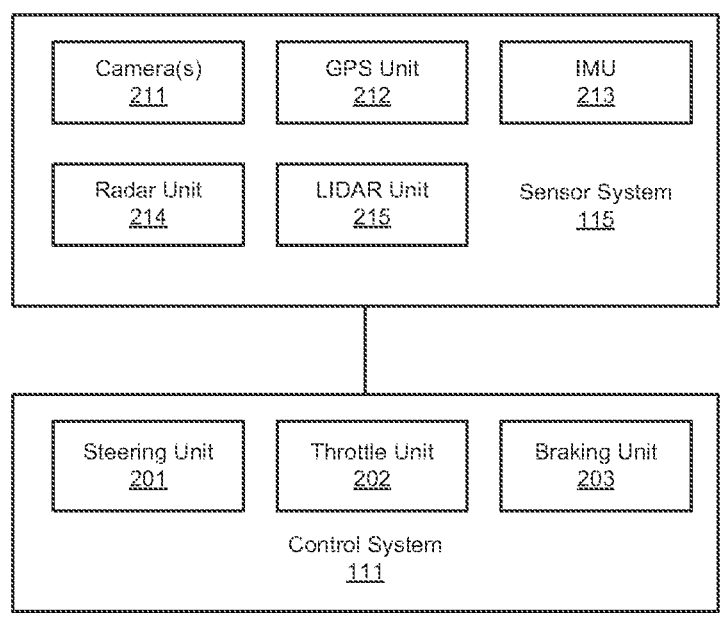
FIG. 2 is a block diagram illustrating an example of an autonomous vehicle according to one embodiment of the invention.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 performs or trains a set of rules, algorithms, and/or predictive models 124 for a variety of purposes. In one embodiment, an MPC model for determining road friction is created for a particular type of autonomous vehicles based on the driving statistics of the same type or similar type of vehicles. The coefficients or gains of the MPC model may be determined based on driving statistics 123, which may be captured and recorded while the vehicles are driven by human drivers under a variety of driving conditions. In one embodiment, the MPC model may include or invoke a cost function to determine road friction in real-time. The road friction may be determined based on a cost between driving in repeated trips from a starting location to a destination location, such that the cost reaches minimum between the repeated trips. The MPC models and the corresponding cost functions may be uploaded onto vehicles of a corresponding type to be utilized to determine road frictions of a particular road in real-time.

Figure 3:
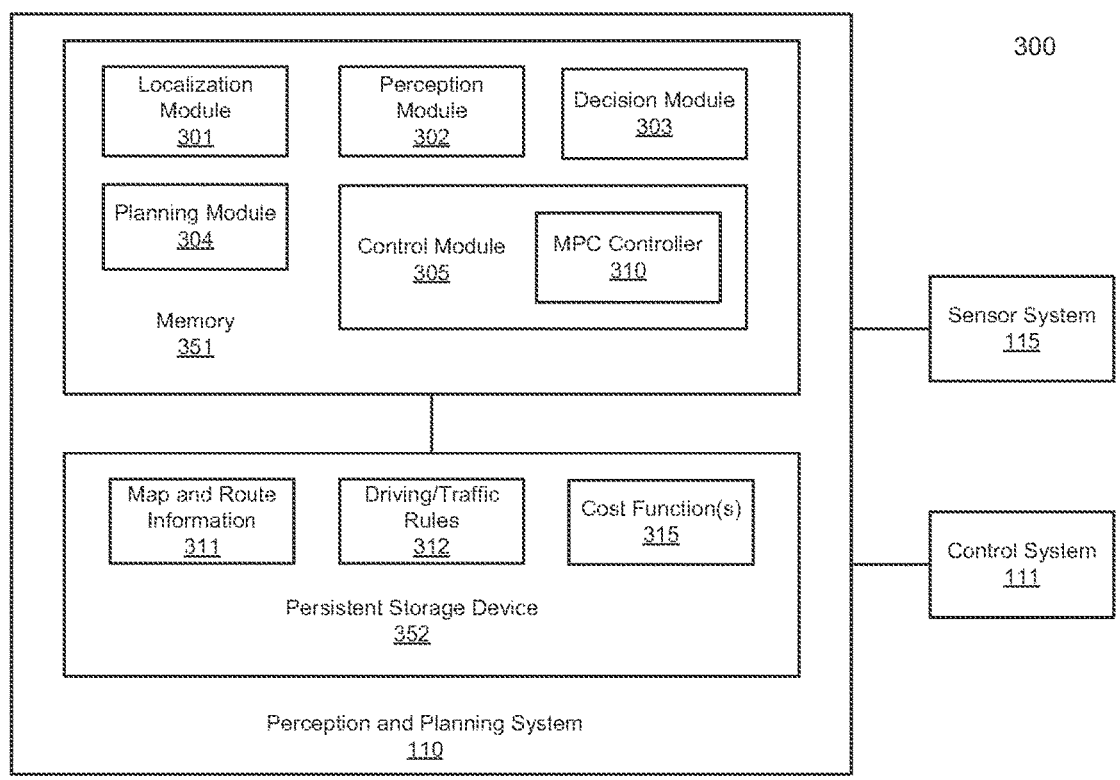
FIG. 3 is a block diagram illustrating an example of a perception and planning system used with an autonomous vehicle according to one embodiment of the invention.

FIG. 3 is a block diagram illustrating an example of a perception and planning system used with an autonomous vehicle according to one embodiment of the invention. System 300 may be implemented as a part of autonomous vehicle 101 of FIG. 1 including, but is not limited to, perception and planning system 110, control system 111, and sensor system 115. Referring to FIG. 3, perception and planning system 110 includes, but is not limited to, localization module 301, perception module 302, decision module 303, planning module 304, and control module 305.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, decision module 303 makes a decision regarding how to handle the object. For example, for a particular object (e.g., another vehicle in a crossing route) as well as its metadata describing the object (e.g., a speed, direction, turning angle), decision module 303 decides how to encounter the object (e.g., overtake, yield, stop, pass). Decision module 303 may make such decisions according to a set of rules such as traffic rules or driving rules 312, which may be stored in persistent storage device 352.

Based on a decision for each of the objects perceived, planning module 304 plans a path or route for the autonomous vehicle, as well as driving parameters (e.g., distance, speed, and/or turning angle). That is, for a given object, decision module 303 decides what to do with the object, while planning module 304 determines how to do it. For example, for a given object, decision module 303 may decide to pass the object, while planning module 304 may determine whether to pass on the left side or right side of the object. Planning and control data is generated by planning module 304 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 305 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

Note that decision module 303 and planning module 304 may be integrated as an integrated module. Decision module 303/planning module 304 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 303/planning module 304 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

According to one embodiment, control module 305 includes MPC controller 310 to determine road friction of a road between two fixed or predetermined locations. The two locations can be a starting location and a destination location of a daily commute route that an ordinary driver would travel back and forth on a regular basis. MPC controller 310 estimates the road friction based on the driving statistics repeatedly collected from iterative trips between two locations. The road friction of a current trip is estimated based on the driving statistics of the current trip in view of the road friction estimated from the prior trip or trips.

In one embodiment, a cost function, such as cost function 315, is utilized to calculate a cost based on the driving statistics and the estimated road friction, such that the difference between the cost of the current trip and the last trip reaches minimum. This process is iteratively performed for each trip traveling between these two locations and the road friction is iteratively estimated and adjusted, until the costs of the last two trips between the same locations converge, i.e., the difference between the costs of the latest two trips is below a predetermined threshold. At that point, the latest estimated road friction will be designated the final road friction of the road. Subsequently, the control commands will be generated and issued in view of the final road friction. The MPC controller 310 and cost function 315 may be created and modeled offline by a data analytics system such as data analytics system 103 of FIG. 1.

Figure 4:
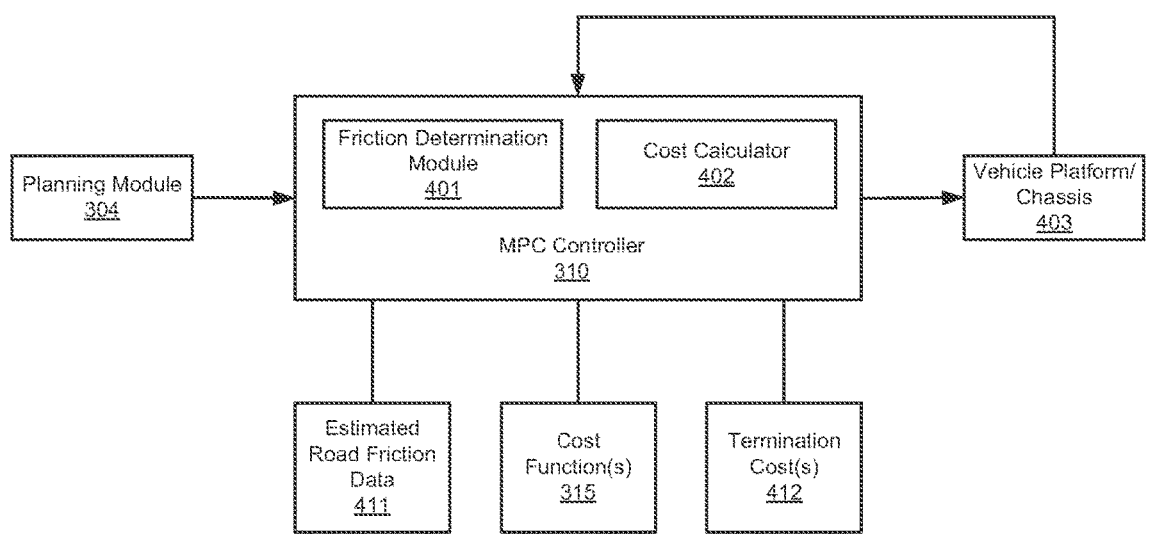
FIG. 4 is a block diagram illustrating an example of a model predictive controller according to one embodiment of the invention.

FIG. 4 is a block diagram illustrating an example of a model predictive controller according to one embodiment of the invention. Referring to FIG. 4, MPC controller 310 includes friction determination module 401 and cost calculator 402, where MPC controller 310 is part of control module 305. In response to planning data received from planning module 304, the control module 305 generates and issues one or more control commands (e.g., throttle, brake, and steering commands) to vehicle platform or chassis 403 to drive the vehicle according to a path planned by planning module 304. The vehicle responses (e.g., location, speed, direction) may be captured and recorded at different points in time, and the responses are fed back to the control module and/or planning module to determine subsequent planning and control commands.

According to some embodiments, MPC controller 310 utilizes a learning-based model predictive control method to learn and adaptively update estimations of road frictions to optimize the control algorithms of autonomous driving. For each trip from a starting location to a destination location, road friction is estimated based on the vehicle responses (e.g., locations, speed, direction) in response to control commands (e.g., throttle, brake, steering commands) issued at different points in time along a path between the starting location and the destination location.

Friction determination module 401 of MPC controller 310 estimates road friction of a current trip based on the road friction estimated during the prior trip from the same starting location to the destination location. The estimated road frictions are estimated and recorded as part of road friction data 411, which may be stored in a persistent storage device such as a hard disk. Cost calculator calculates a cost for each of the trips based on the differences between the road frictions between the current trip and the prior trip(s) using one or more cost functions 315. As described above, cost function(s) 315 may be created and modeled offline. The cost may be calculated further in view of a termination cost of a prior trip, which may be recorded as part of termination costs 412 stored in a persistent storage device. The term of "termination cost" refers to the cost calculated at the destination location of a particular trip using a cost function.

The road frictions are iteratively estimated by MPC controller 310 for each trip from the starting location to the destination, until a difference of the costs of the last two trips drops below a predetermined threshold. At that point, the last estimated road friction is designated as the final road friction going forward for the road between the starting location and the destination location. The road friction may be utilized to determine subsequent control commands for the purpose of driving an autonomous driving vehicle from the starting location and the destination location.

In one embodiment, planning data is received, for example, from planning module 304, to drive an autonomous driving vehicle (ADV) from a starting location and a destination location. In response, a series of control commands are generated by the control module based on the planning data, where the control commands are to be applied at different points in time from the starting location to the destination location. Cost calculator 402 of MPC controller calculates a cost by applying cost function 315 to the control commands, a first road friction to be estimated in a current trip, and a second road friction (e.g., friction data 411) estimated during a prior trip from the starting location to the destination location. Friction determination module 401 estimates the first road friction of the current trip using the cost function in view of prior termination cost 412 of the prior trip, such that the cost reaches minimum. The termination cost 412 was the cost calculated at the destination of the prior strip.

Figure 5:
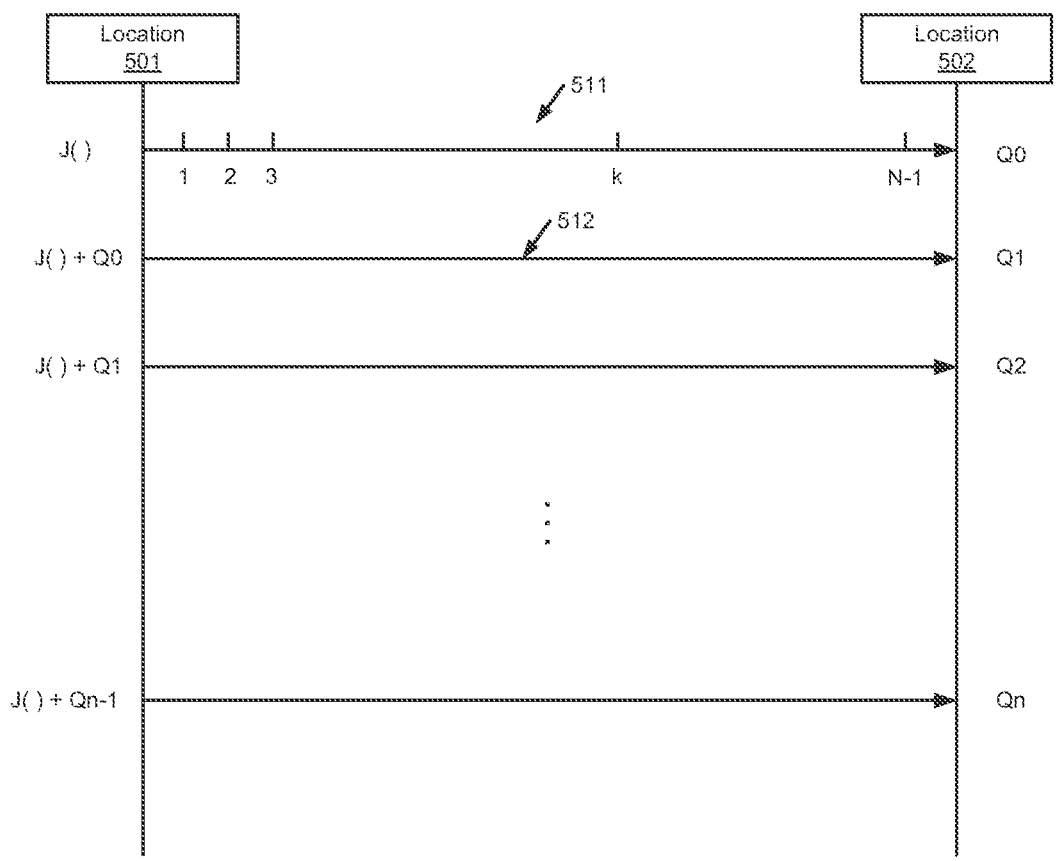
FIG. 5 is a transactional diagram illustrating a process of estimating road friction according one embodiment of the invention.

FIG. 5 is a transactional diagram illustrating a process of estimating road friction according one embodiment of the invention. Referring to FIG. 5, when a vehicle travels repeatedly between two known locations, in this example, location 501 and location 502, the prior driving statistics can be utilized to estimate road frictions. For example, location 501 may be home location and location 502 may be a workplace for a particular user. The user may drive the vehicle between locations 501-502 daily on a regular basis. When planning data is received from a planning module to drive a vehicle from location 501 to location 502, a series of control commands are generated to be applied to the vehicle at different points in time along a path from location 501 to location 502, as indicated by time ticks 1, 2, ... k, ..., and n−1.

For each of the points in time, the vehicle responses (e.g., location, speed, and direction) are measured and recorded in response to the control commands, e.g., issued in the previous point in time or timeslot, also referred to as a command cycle. In addition, a road friction associated with a road segment corresponding to each point in time is estimated in view of the friction estimated from a prior trip for the same point in time. A cost function is utilized to calculate a cost based on the difference between the frictions estimated in the current trip and the friction estimated in the prior trip between location 501 and location 502. The difference represents an error in estimating the road frictions between two iterative trips. The goal is to estimate the road friction for the current trip such that the cost (representing the error) reaches minimum. Thus, the estimation of road friction will become closer to the actual road friction for each trip. As a number of trips increases, the estimation of the road friction iteratively performed will eventually be sufficiently close enough to represent the actual road friction.

Referring back to FIG. 5, assuming trip 511 is the first overall trip from location 501 to location 502, the system initially sets an initial road friction to each of the road segments represented by time or command cycles 1 to N, referred to as a road segment friction. For each of the command cycles, in response to a control command (e.g., throttle, brake, steering) issued during the command cycle, a response from the vehicle (e.g., location, speed, direction) is measured. A command cycle refers to a periodic period of time a control command will be issued. For example, a control command may be issued every 0.1 second. The time period of 0.1 second is referred to as a command cycle.

Typically, the response from the vehicle in response to a control command will be affected by the road friction. A cost for trip 511 is calculated using a cost function (denoted as cost function J) in view of the control commands, the responses from the vehicle, the estimated road friction of the current trip (e.g., the initial road friction), and the road friction estimated from the prior trip (e.g., the "actual" friction determined in the prior trip). In this example, since trip 511 is the first overall trip, the system may assign a predetermined initial value. In one embodiment, the road friction may be initially assigned with a large value such as 2, while a typical friction for a try road may be around 0.9. The road friction of a trip is represented by a number of road segment frictions associated with the road segments between location 501 and location 502. Each road segment corresponds to one of the points in time or command cycles. The road segment frictions for the time or command cycles 1 to N are estimated or adjusted such that the cost reaches the minimum. The cost is also referred to as the termination cost for the trip. In this example, termination cost $Q_0$ is calculated and maintained for trip 511.

When the vehicle travels again from location 501 to location 502, in this example, trip 512, the above process is iteratively performed to estimate the road friction for the trip based on the road friction estimated from a prior trip, i.e., trip 511. As shown in FIG. 5, for trip 512, the cost function would be based on the termination cost of the prior trip (e.g., trip 511): $J+Q_0$. The cost for trip 512 will be calculated using the cost function in view of the termination cost $Q_0$ of trip 511. The road friction for trip 512 is estimated, such that the cost of the cost function in view of the termination cost of trip 511 reaches minimum. Specifically, the road friction for trip 512 may be estimated based on the differences between road segment frictions estimated during trip 512 and the corresponding road segment frictions estimated for the corresponding road segments 1 to N in this example during trip 511 as described above. The cost represents a sum or total of errors between the estimated road segment frictions of the current trip and the estimated road segment frictions of the prior trip.

The above process is iteratively performed until the difference between the termination cost of a current trip and the termination cost of a prior trip converges. That is the above process is iteratively performed until the difference of the termination costs between the current trip and the last trip is below a predetermined threshold. In such situation, the latest estimated road friction of the latest trip will become the estimated road friction representing the actual road friction. By iteratively performing the cost process in view of the prior cost and road friction estimations as feedbacks, the accuracy of the estimation can be improved over time.

The cost function may be created and modeled based on an MPC algorithm or model as a part of MPC controller 310. Model predictive controllers rely on dynamic models of the process, most often linear empirical models. The main advantage of MPC is the fact that it allows the current timeslot to be optimized, while keeping future timeslots in account. This is achieved by optimizing a finite time-horizon, but only implementing the current timeslot. MPC has the ability to anticipate future events and can take control actions accordingly. MPC models predict the change in the dependent variables of the modeled system that will be caused by changes in the independent variables. Independent variables that cannot be adjusted by the controller are used as disturbances. Dependent variables in these processes are other measurements that represent either control objectives or process constraints. These changes are calculated to hold the dependent variables close to target while honoring constraints on both independent and dependent variables.

In one embodiment, a cost function (J) can be implemented as follows:

$$J^j = \min\left[\sum_0^{N-1} \alpha e_k^2 + \Delta_k\right] + Q^{j-1}$$

where $e_k$ represents an error between the road friction corresponding to the point in time (k) during a current trip (j) and the estimated road friction (e.g., road friction determined based on a prior trip) for the current trip. $\Delta_k$ is a constant indicating whether the vehicle reaches the destination. $\Delta_k$ may be set to one if the vehicle reaches the destination; otherwise it is zero. $Q^{j-1}$ represents a termination cost of a prior trip (j−1).

Note that the above MPC cost function is referred to as an augmented MPC cost function as it considers the termination cost of a previous trip, while a conventional MPC function does not take into the account of the termination cost of a prior trip. A conventional MPC cost function, referred to herein as a nominal cost function, would have only the first part, without considering the terminal cost of a prior trip $Q^{j-1}$ as follows:

$$J^j = \min\left[\sum_0^{N-1} \alpha e_k^2 + \Delta_k\right]$$

In one embodiment, the above MPC cost function can be represented by the following formula:

$$J^j = \min\left[\sum_0^{N-1} q_k^T M q_k + \mu_k^T N \mu_k + \Delta_k\right] + Q^{j-1}$$

where $q_k$ is a state matrix representing the state of the vehicle at the point in time (k). $q_k^T$ represents a transpose of $q_k$.

In one embodiment, $Q_k = \{x_k, y_k, v_k, s_k, e_k\}$. $x_k$ and $y_k$ represent the location of the vehicle at time (k), e.g., the latitude and longitude of the vehicle. $v_k$ represents the speed of the vehicle at time (k). $s_k$ represents the estimated road friction corresponding to the road segment at time (k). $e_k$ represents the error between the road frictions of a road segment corresponding to time (k) estimated in the current trip and the last trip. M is a state weighting matrix (e.g., a 5 by 5 matrix). $\mu_k$ represents an input matrix representing control commands issued at time (k) in view of the estimated friction $s_k$. $\mu_k^T$ represents a transpose of $\mu_k$. In one embodiment, $\mu_k = \{\alpha_k, \theta_k, s_{k+1} - s_k\}$, where $\alpha_k$ represents a speed control command (e.g., throttle or brake commands) and $\theta_k$ represents a steering command. $s_{k+1} - s_k$ represents the difference between the road friction determined at timeslot (k+1) and timeslot (k) within the same trip. N is an input weighting matrix (e.g., a 3 by 3 matrix). M and N can be predetermined by a data analytics system such as data analytics system 103. In this example, the independent variables in the MPC model are $\mu_k$. The dependent variables are the locations, directions/angles, speeds, and rotational rates, etc. of the vehicle.

Figure 6:
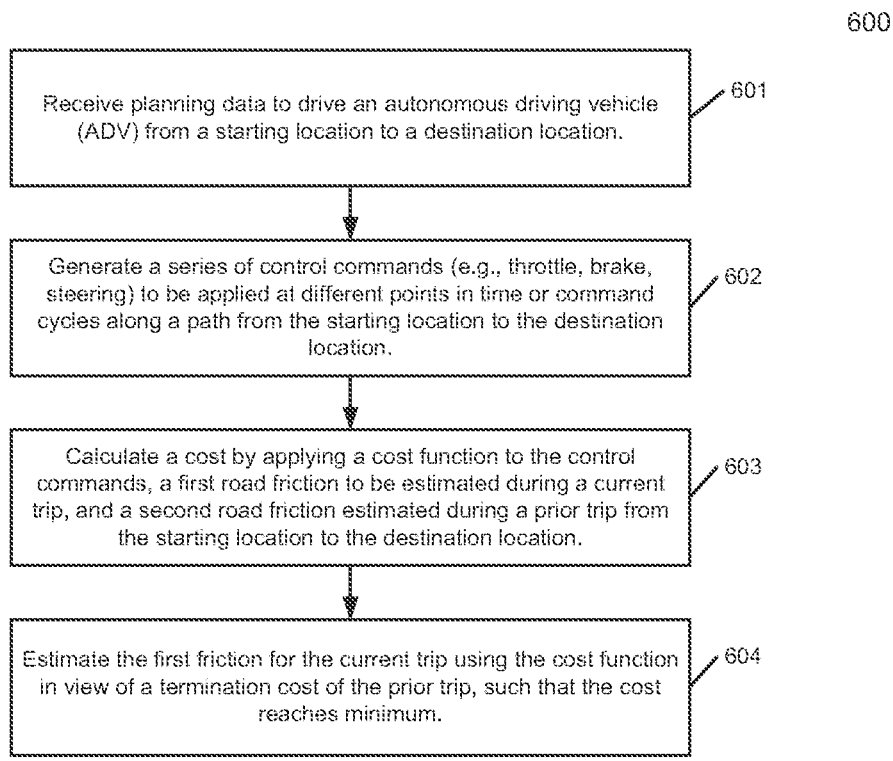
FIG. 6 is a flow diagram illustrating a process of estimating road friction according to one embodiment of the invention.

FIG. 6 is a flow diagram illustrating a process of estimating road friction according to one embodiment of the invention. Process 600 may be performed by processing logic which may include software, hardware, or a combination thereof. For example, process 600 may be performed by MPC controller 310 of FIG. 3. Referring to FIG. 6, in operation 601, processing logic receives planning data to drive an autonomous driving vehicle (ADV) from a starting location to a destination location. Based on the planning data, in operation 602, processing logic generates a series of control commands (e.g., throttle, brake, steering commands) to be applied at different points in time or command cycles along a path from the starting location to the destination location. In operation 603, processing logic calculates a cost by applying a cost function to the control commands, a first road friction to be estimated on a current trip, and a second road friction estimated during a prior trip from the starting location to the destination location. In operation 604, processing estimates or adjusts the first road friction for the current trip using the cost function in view of a termination cost of the prior trip between the starting location and the destination location, such that the cost reaches the minimum.

Figure 7:
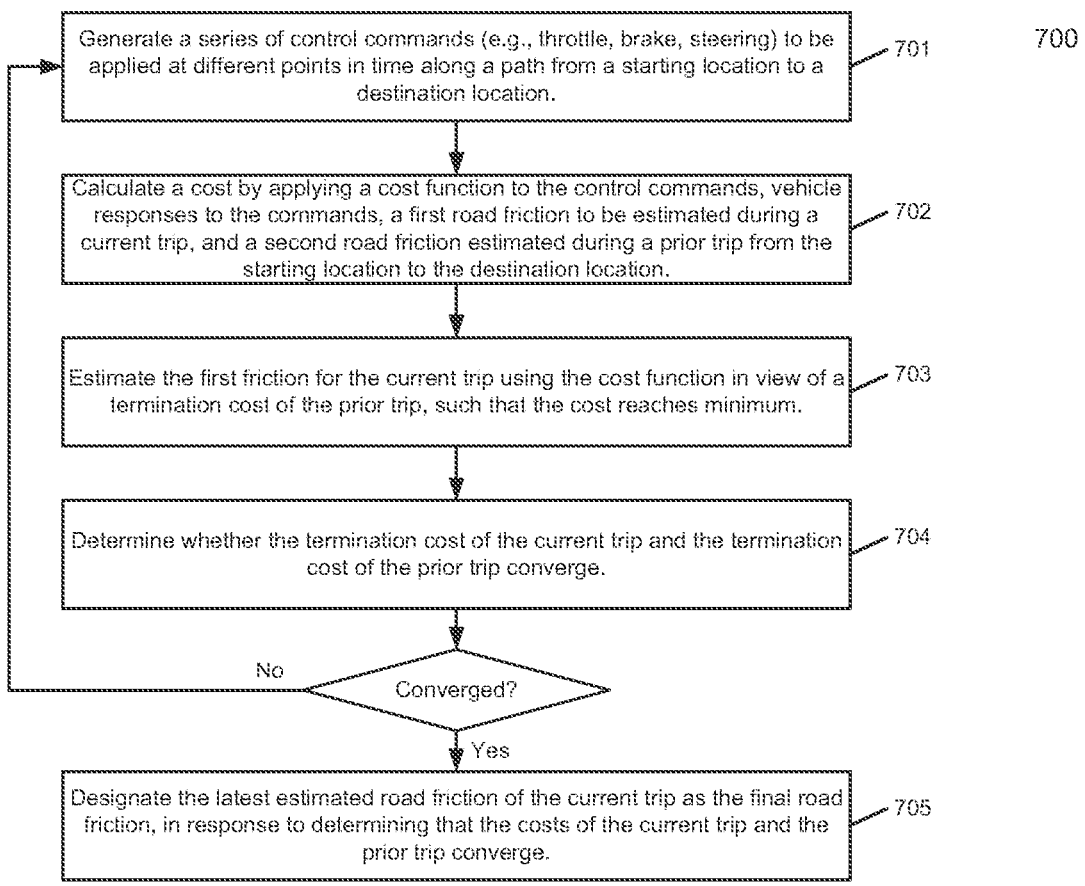
FIG. 7 is a flow diagram illustrating a process of estimating road friction according to another embodiment of the invention.

FIG. 7 is a flow diagram illustrating a process of estimating road friction according to another embodiment of the invention. Process 700 may be performed by processing logic which may include software, hardware, or a combination thereof. For example, process 600 may be performed by MPC controller 310 of FIG. 3. Referring to FIG. 7, in operation 701, processing logic generates a series of control commands (e.g., throttle, brake, steering commands) to be applied at different points in time or command cycles along a path from a starting location to a destination location. In operation 702, processing logic calculates a cost by applying a cost function to the control commands, vehicle responses to prior control commands, a first road friction to be estimated on a current trip, and a second road friction estimated during a prior trip from the starting location to the destination location. In operation 703, processing estimates or adjusts the first road friction for the current trip using the cost function in view of a termination cost of the prior trip between the starting location and the destination location, such that the cost reaches the minimum. In operation 704, processing logic compares the termination cost of the current trip and the termination cost of the prior strip to determine whether the costs converge. In operation 705, the latest estimated road friction will be designated as the final estimated (e.g., actual) road friction if the costs of the current trip and the prior trip converge. Otherwise, the operations 701-704 may be iteratively performed in a subsequent trip from the starting location to the destination location.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 8:
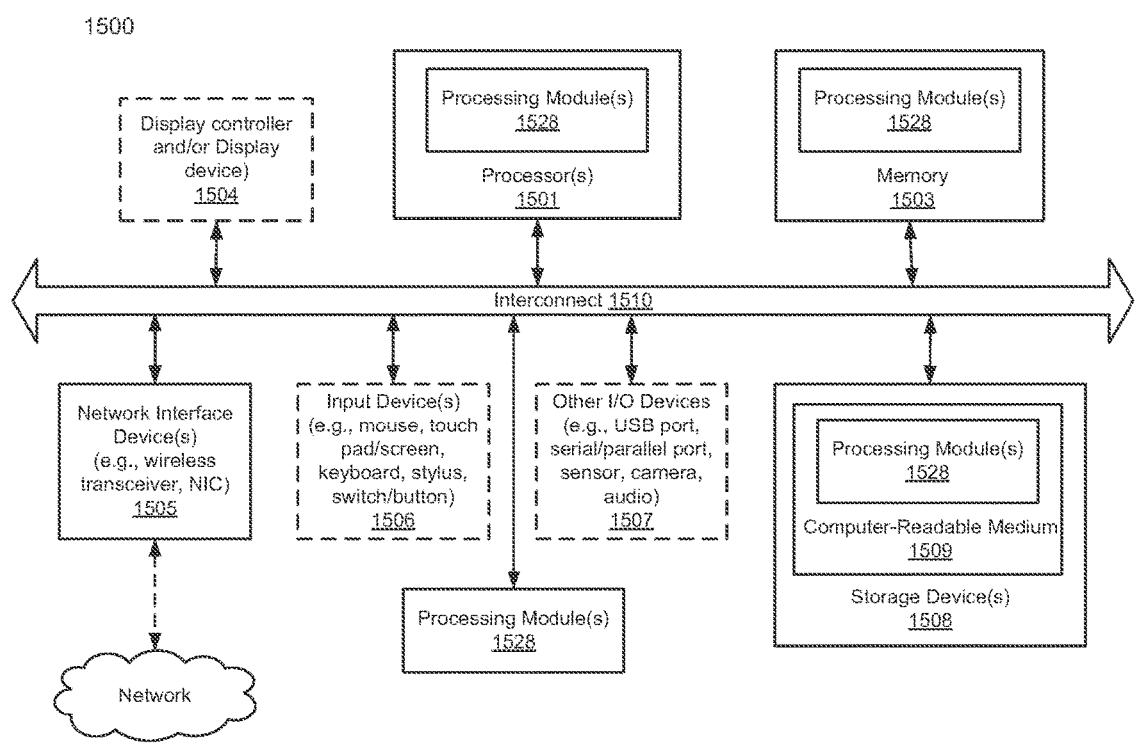
FIG. 8 is a block diagram illustrating a data processing system according to one embodiment.

FIG. 8 is a block diagram illustrating an example of a data processing system which may be used with one embodiment of the invention. For example, system 1500 may represent any of data processing systems described above performing any of the processes or methods described above, such as, for example, perception and planning system 110 or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, planning module 304 and/or control module 305. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for operating an autonomous driving vehicle, the method comprising:
   receiving planning data to drive an autonomous driving vehicle (ADV) from a starting location to a destination location;
   generating a series of control commands based on the planning data, the control commands to be applied at a plurality of points in time from the starting location to the destination location;
   calculating a cost by applying a cost function to the control commands, a first road friction to be estimated in a current trip from the starting location to the destination location, and a second road friction estimated during a prior trip from the starting location to the destination location; and
   estimating the first road friction of the current trip using the cost function in view of a prior termination cost of the prior trip, such that the cost reaches minimum.

2. The method of claim 1, wherein the prior termination cost comprises a prior cost calculated at the destination location of the prior trip using the cost function.

3. The method of claim 1, further comprising:
   calculating a current termination cost for the current trip when the ADV reaches the destination location;
   comparing the prior termination cost of the prior trip and the current termination cost of the current trip to determine whether a difference between the prior and current termination costs is below a predetermined threshold; and
   iteratively performing generating a series of control commands and calculating a cost by applying a cost function to the control commands for a new trip from the starting location to the destination location, in response to determining that the difference is above the predetermined threshold.

4. The method of claim 3, further comprising designating the first road friction of the current trip as a final road friction between the starting location and the destination location, in response to determining that the difference is below the predetermined threshold.

5. The method of claim 4, wherein the final road friction is utilized to determine subsequent control commands for the ADV in a subsequent trip from the starting location to the destination location.

6. The method of claim 1, wherein estimating the first road friction comprises:
   estimating a plurality of first road segment frictions of a plurality of road segments corresponding to the plurality of points in time between the starting location and the destination location; and
   determining differences between the first road segment frictions with a plurality of second road segment frictions that were estimated for corresponding points in time during the prior trip, wherein the cost is calculated based on the differences between the first road segment frictions and the second road segment frictions.

7. The method of claim 6, wherein the cost is calculated based on a sum of the differences between the first road segment frictions and the second road segment frictions.

8. The method of claim 6, wherein each of the first road segment frictions is estimated based on a location of the ADV and a speed of the ADV in response to a control command issued at a point in time of a corresponding road segment.

9. A non-transitory machine-readable medium having instructions stored therein, which when executed by a processor, cause the processor to perform operations, the operations comprising:
   receiving planning data to drive an autonomous driving vehicle (ADV) from a starting location to a destination location;
   generating a series of control commands based on the planning data, the control commands to be applied at a plurality of points in time from the starting location to the destination location;
   calculating a cost by applying a cost function to the control commands, a first road friction to be estimated in a current trip from the starting location to the destination location, and a second road friction estimated during a prior trip from the starting location to the destination location; and estimating the first road friction of the current trip using the cost function in view of a prior termination cost of the prior trip, such that the cost reaches minimum.

10. The machine-readable medium of claim 9, wherein the prior termination cost comprises a prior cost calculated at the destination location of the prior trip using the cost function.

11. The machine-readable medium of claim 9, wherein the operations further comprise:
calculating a current termination cost for the current trip when the ADV reaches the destination location;
comparing the prior termination cost of the prior trip and the current termination cost of the current trip to determine whether a difference between the prior and current termination costs is below a predetermined threshold; and
iteratively performing generating a series of control commands and calculating a cost by applying a cost function to the control commands for a new trip from the starting location to the destination location, in response to determining that the difference is above the predetermined threshold.

12. The machine-readable medium of claim 11, wherein the operations further comprise designating the first road friction of the current trip as a final road friction between the starting location and the destination location, in response to determining that the difference is below the predetermined threshold.

13. The machine-readable medium of claim 12, wherein the final road friction is utilized to determine subsequent control commands for the ADV in a subsequent trip from the starting location to the destination location.

14. The machine-readable medium of claim 9, wherein estimating the first road friction comprises:
estimating a plurality of first road segment frictions of a plurality of road segments corresponding to the plurality of points in time between the starting location and the destination location; and
determining differences between the first road segment frictions with a plurality of second road segment frictions that were estimated for corresponding points in time during the prior trip, wherein the cost is calculated based on the differences between the first road segment frictions and the second road segment frictions.

15. The machine-readable medium of claim 14, wherein the cost is calculated based on a sum of the differences between the first road segment frictions and the second road segment frictions.

16. The machine-readable medium of claim 14, wherein each of the first road segment frictions is estimated based on a location of the ADV and a speed of the ADV in response to a control command issued at a point in time of a corresponding road segment.

17. A data processing system, comprising:
a processor; and
a memory coupled to the processor to store instructions, which when executed by the processor, cause the processor to perform operations, the operations including
receiving planning data to drive an autonomous driving vehicle (ADV) from a starting location to a destination location,
generating a series of control commands based on the planning data, the control commands to be applied at a plurality of points in time from the starting location to the destination location,
calculating a cost by applying a cost function to the control commands, a first road friction to be estimated in a current trip from the starting location to the destination location, and a second road friction estimated during a prior trip from the starting location to the destination location, and
estimating the first road friction of the current trip using the cost function in view of a prior termination cost of the prior trip, such that the cost reaches minimum.

18. The system of claim 17, wherein the prior termination cost comprises a prior cost calculated at the destination location of the prior trip using the cost function.

19. The system of claim 17, wherein the operations further comprise:
calculating a current termination cost for the current trip when the ADV reaches the destination location;
comparing the prior termination cost of the prior trip and the current termination cost of the current trip to determine whether a difference between the prior and current termination costs is below a predetermined threshold; and
iteratively performing generating a series of control commands and calculating a cost by applying a cost function to the control commands for a new trip from the starting location to the destination location, in response to determining that the difference is above the predetermined threshold.

20. The system of claim 19, wherein the operations further comprise designating the first road friction of the current trip as a final road friction between the starting location and the destination location, in response to determining that the difference is below the predetermined threshold.

21. The system of claim 20, wherein the final road friction is utilized to determine subsequent control commands for the ADV in a subsequent trip from the starting location to the destination location.

22. The system of claim 17, wherein estimating the first road friction comprises:
estimating a plurality of first road segment frictions of a plurality of road segments corresponding to the plurality of points in time between the starting location and the destination location; and
determining differences between the first road segment frictions with a plurality of second road segment frictions that were estimated for corresponding points in time during the prior trip, wherein the cost is calculated based on the differences between the first road segment frictions and the second road segment frictions.

* * * * *